(12) United States Patent
Toyama et al.

(10) Patent No.: US 8,201,074 B2
(45) Date of Patent: Jun. 12, 2012

(54) TALKING PAPER AUTHORING TOOLS

(75) Inventors: Kentaro Toyama, Sadashivnagar (IN); Gerald Chu, Salem, OR (US); Ravin Balakrishnan, Toronto (CA)

(73) Assignee: Microsoft Corporation, Redmond, WA (US)

( * ) Notice: Subject to any disclaimer, the term of this patent is extended or adjusted under 35 U.S.C. 154(b) by 850 days.

(21) Appl. No.: 12/247,891

(22) Filed: Oct. 8, 2008

(65) Prior Publication Data

US 2010/0088582 A1    Apr. 8, 2010

(51) Int. Cl.
   *G06F 17/00* (2006.01)
   *G10L 13/06* (2006.01)

(52) U.S. Cl. ........ 715/201; 715/205; 715/234; 715/249; 715/731; 704/260; 704/269

(58) Field of Classification Search .................. 715/200, 715/201, 202, 204, 205, 209, 231, 234, 239, 715/249, 255, 256, 273, 274, 700, 719, 727, 715/728, 729, 731, 760, 210, 226, 229, 253, 715/762; 704/2, 4, 5, 200, 203, 251, 260, 704/269, 270.1, 277, 278
See application file for complete search history.

(56) References Cited

U.S. PATENT DOCUMENTS

| | | | |
|---|---|---|---|
| 4,884,974 A | 12/1989 | DeSmet | |
| 5,063,698 A | 11/1991 | Johnson et al. | |
| 5,417,575 A | 5/1995 | McTaggart | |
| 5,466,158 A | 11/1995 | Smith, III | |
| 5,915,734 A * | 6/1999 | Minehart | 283/117 |
| 5,929,848 A | 7/1999 | Albukerk et al. | |
| 6,288,319 B1 | 9/2001 | Catona | |
| 6,421,524 B1 | 7/2002 | Padgett | |
| 6,933,928 B1 | 8/2005 | Lilienthal | |
| 6,985,693 B2 * | 1/2006 | Kirwan | 434/317 |
| 7,152,350 B2 * | 12/2006 | Youngdahl | 40/124.06 |
| 7,224,934 B2 * | 5/2007 | Mullen | 434/317 |
| 7,809,576 B2 * | 10/2010 | Lallouz et al. | 704/271 |
| 2003/0033147 A1 * | 2/2003 | McCartney et al. | 704/260 |
| 2003/0167449 A1 * | 9/2003 | Warren et al. | 715/531 |
| 2003/0212996 A1 * | 11/2003 | Wolzien | 725/60 |
| 2004/0254859 A1 * | 12/2004 | Aslanian, Jr. | 705/27 |
| 2008/0140413 A1 | 6/2008 | Millman et al. | |

OTHER PUBLICATIONS

Audio Tours, retrieved on Jun. 19, 2008 at <<http://www.vistagroupinternational.com/AuTour.html>>, Vista Group International.

Motion Studio, retrieved on Jun. 19, 2008 at <<http://www.sharewareconnection.com/motion-studio.htm>>, Shareware Connection.

Raffle, The Future of Interface Design, Through a Child's Eyes retrieved on Jun. 19, 2008 at <<http://www.cs.tufts.edu/~jacob/workshop/papers/raffle.pdf>>, Tangible Media Group, MIT Media Lab.

* cited by examiner

*Primary Examiner* — Maikhanh Nguyen
(74) *Attorney, Agent, or Firm* — Lee & Hayes, PLLC

(57) ABSTRACT

A range of unified software authoring tools for creating a talking paper application for integration in an end user platform are described herein. The authoring tools are easy to use and are interoperable to provide an easy and cost-effective method of creating a talking paper application. The authoring tools provide a framework for creating audio content and image content and interactively linking the audio content and the image content. The authoring tools also provide for verifying the interactively linked audio and image content, reviewing the audio content, the image content and the interactive linking on a display device. Finally, the authoring tools provide for saving the audio content, the video content and the interactive linking for publication to a manufacturer for integration in an end user platform or talking paper platform.

19 Claims, 6 Drawing Sheets

212 USER LINKS AUDIO AND IMAGE CONTENT

214 USER REVIEWS THE AUDIO CONTENT, THE IMAGE CONTENT AND THE LINKING

216 USER SAVES THE AUDIO CONTENT, THE IMAGE CONTENT AND THE LINKING FOR INTEGRATION IN AN END USER PLATFORM

TALKING PAPER AUTHORING TOOLS

BACKGROUND

Traditional multimedia devices that combine imagery, video, audio and interactivity are very useful in environments such as general education and any environment in which the combination of images and audio can be used effectively. Computing devices, such as PCs, PDAs and high-end mobile phones are examples of devices that serve this educational purpose. However, these devices are expensive and, thus, out of reach for many economically challenged communities around the world who may benefit greatly from such a device.

"Talking paper" is the term used for combinations of image, audio and interactivity that involve printed, hand-illustrated or any other static image content with electronically generated audio content. The use of a talking paper device is one method for making these interactive multimedia devices more affordable. Although a number of talking paper products currently exist, such as the electronic greeting card or the electronic talking book, the tools used to create content for these products are meant for teams of specially trained experts. However, a need exists for a range of unified software authoring tools which provides for a method to create a talking paper application that is easier and more cost effective.

SUMMARY

This document describes a range of software authoring tools for creating talking paper applications. The range of software authoring tools allow for creation of audio content and image content and interactive linking of the audio content and the image content. These tools also allow for verification of the interactively linked audio and image content and review of the audio content, the image content and the interactive linking on a display device. Further, these tools allow for saving of the audio content, the image content and the interactive linking for publication to a manufacturer for integration in an end user or talking paper platform.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
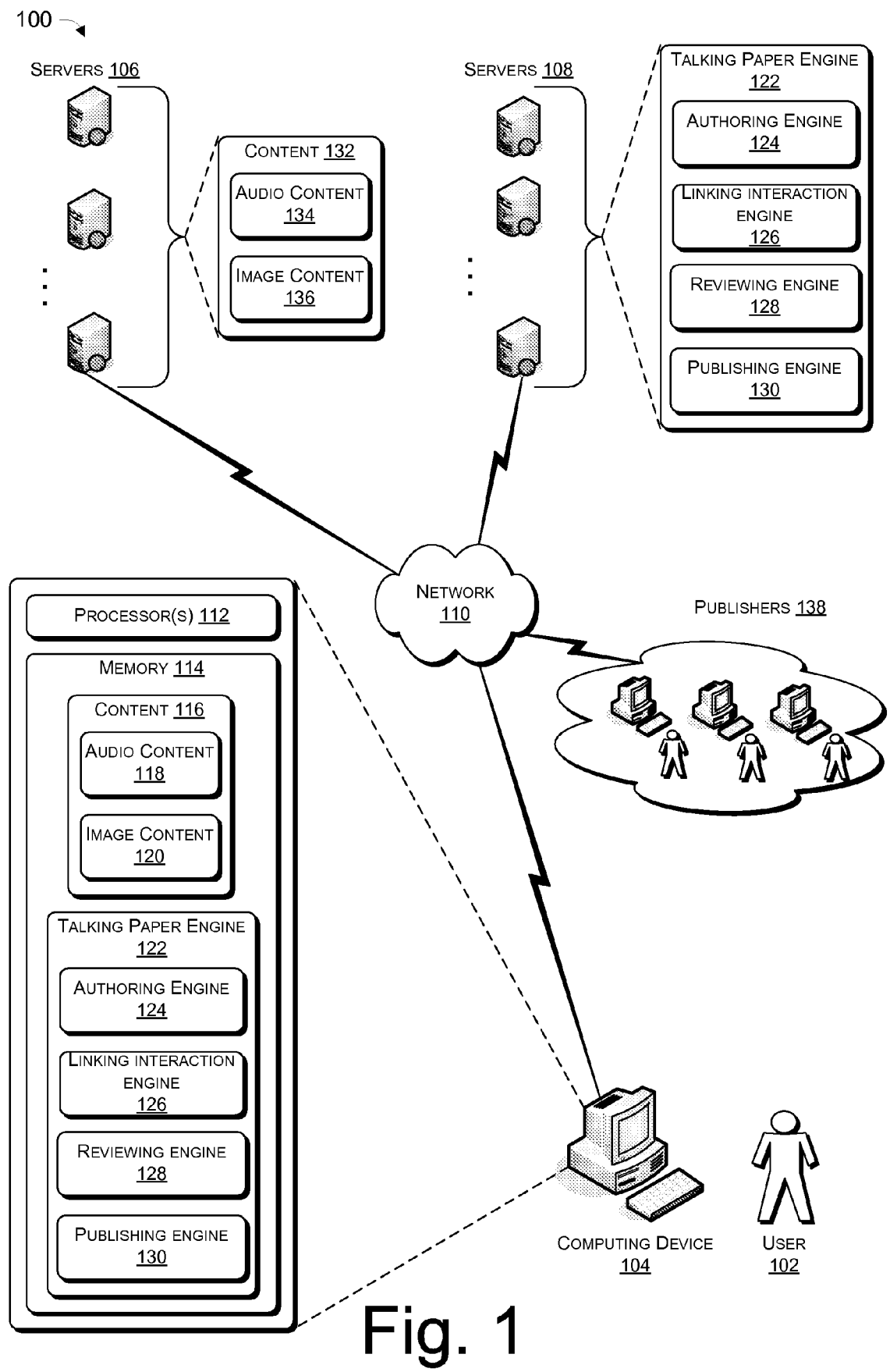
FIG. 1 depicts an illustrative architecture that may implement a range of unified software authoring tools for creating talking paper applications.

This document describes a range of unified software tools for authoring talking paper applications. A desktop talking paper authoring tool is a tool or series of tools that allows for the creation of content for various talking paper platforms in an easy and cost effective manner. An authoring tool typically allows a user to author, review, verify and publish content. Such authoring tools may be primarily software that is performed on hardware that is capable of computation and publication, such as printing and transfer of files to other devices. However, the talking paper authoring tools may also be built as a special purpose hardware device.

A "talking paper platform" may comprise a platform that includes a static visual medium or image content portion and an audio medium or content portion that is typically electronic. The visual or image content portion and the audio content portion may be interactively linked such that the audio content portion is activated upon selection of the corresponding image content portion. Talking paper platforms may include, but are not limited to, electronic greeting cards, electronic talking books, museum audio tour systems, and the like. Talking paper platforms may also include any combination of visual content and audio-playback devices where the visual content comprises paper, a poster, a book, a brochure or pamphlet, a painted surface, a billboard, a collage or mosaic, an LED- or LCD-based display and/or any other visual or printed medium. The audio playback device, meanwhile, may comprise a mobile phone, a cassette tape player, a dictaphone, a CD player, a record player, a turntable or gramophone, an MP3 player, an Apple iPod, a processor/speaker combination, a miniature audio playback device and/or any other audio playback device. It is also possible for the talking paper platform to be additionally or alternatively linked to a more sophisticated computing device, such as a PC or mobile phone, by a USB interface for example.

The talking paper application, meanwhile, is the content that is incorporated into a talking paper platform. The term "content" consists of a combination of image content, audio content and interactive linking. The range of authoring tools typically includes creating or generating new audio content or adapting existing audio content and creating or generating new image content or adapting existing audio content. The range of authoring tools also includes interactively linking the audio content and the image content, reviewing the interactively linked content, verifying the interactively linked content. Finally, the range of authoring tools includes publishing the content or talking paper application to a format or device for a manufacturer to integrate into a talking paper platform. The publishing portion of the set of authoring tools may include the ability to mass produce the publication depending on the needs of the manufacturer. For instance, the manufacturer may request the publication in an electronic format whereby the manufacturer will only need the master electronic copy which will be used in the manufacturing process to produce the talking paper platform. However, the manufacturer may desire production copies of the image content and electronic copies of the audio content and linking information to utilize in the production process. In this case, production quantities may be needed.

The process described above can be accomplished in many different ways depending on the talking paper application to be created. Choosing and/or creating the audio content and the image content may be accomplished in any order. After creation or selection of the audio and image content, one or more portions of the image content may be interactively linked with one or more portions of the audio content. After this linking, the links may be reviewed, verified and, finally, the talking paper unit may be saved in a format suitable for publishing the talking paper unit to an end user platform (e.g., an electronic book, greeting card, etc.).

As such, the authoring tools described herein may allow for, simplify and (in some instances) automate the process of linking image content with audio content. For example, the authoring tools may provide for printing numbers on comic book images such that when such images are entered into a mobile phone as a user consumes the corresponding image, the linked audio content would playback on the mobile phone. The authoring tools may allow these numbers in this and other examples to be automatically incremented or numbered by page to enable an automated number system. The numbers could also be unique at the page level, at the specific content level or globally unique so that no two numbers are ever repeated across all content generated for the same platform. Alternatives to numbers, such as symbols, names or any other method to index and associate visual content with audio content, may also be used.

The authoring tools may also allow for, simplify and automate the process of creating interactive links in which the audio content instructs users to perform a particular action. For example, the audio content may instruct the user to "turn to page 3 in the image content" or "refer to book X, page 12." The audio content may similarly include any other type of instruction that tells the user where to find the image content that correlates with the audio content. Thus, the interactive link may be a physical link or a non-physical link depending on the application. The interactive links may be hierarchically organized, possibly pointing to different pages in the image content. The organization of the interactive links may be automated or determined by the user.

The authoring tools may also integrate a text-to-speech component that automatically generates the audio content from entered text. The authoring tools may also integrate cartooning tools or other image processing tools that automatically generate cartoons or drawings from photographs. Further, the authoring tools may include standard video or audio editing tools or allow for the automatic inclusion of audio instructions for how to use the talking paper platform and view the content. As such, the number and type of authoring tools to be used in creating the talking paper application can easily be scaled and incorporated depending on the needs identified in the particular talking paper platform.

The authoring tools may also provide for automated or user-assisted input from other media. For instance, a text-based computer file may be automatically or semi-automatically converted into talking paper content with text summarization and text-to-speech technology that generates corresponding audio content. The resulting content can be saved and/or published. In other instances, printed matter, such as a book, can be scanned and processed with optical character recognition (OCR) and then automatically or semi-automatically converted into talking paper content with text summarization and text-to-speech technology generating corresponding audio. Again, the resulting content can be saved and/or published.

Furthermore, a computer document may also be automatically or semi-automatically converted into talking paper content, with text summarization and text-to-speech technology generating audio for text and images being automatically used as part of the image content. The resulting content may then be saved and/or published. In any of the above examples, the described authoring tools may provide a user interface that allows user customization or assistance in instances where automatic means for summarization, text-to-speech, OCR or document segmentation are not satisfactory.

The described tools may also provide extensive publishing capabilities. For instance, publishing the image content may be accomplished by printing, for example, with a printing press, computer printer, silk screen, or some other similar device. Publishing the image content may also include the ability to display the image content on a mechanical or electronic display. Stored instructions for a mechanical or electronic display or stored instructions for a computing device with display are other ways of publishing the image content. Publishing image content may also include instructions to a human illustrator, to the Internet or any other manner specified by the manufacturer of the talking paper platform. Publishing the image content and/or the audio content may also happen at a large scale in production quantities such that multiple copies of the image content are reproduced in one quick task. Publishing the image content and/or the audio content may also include transferring data from one device to another device via wired or wireless means, by transfer using an electronic storage device such as a CD-ROM, DVD, USB flash drive, Blue Ray disc or other similar storage devices.

The publication process may also involve additional hardware components, where the components may include any of the following: (1) manufacturing at a remote factory, (2) accessibility by an author or user, or (3) manufacturing with a special manufacturing device. The hardware components may include buttons, RFID tags, small electronic components, inactive physical objects or any other similar hardware components. The publication process would involve affixing these components to the content or providing instructions to authors or users to affix the components to specified portions of content where the image content resides.

In some cases, such as the electronic greeting cards, where the talking paper platform is an integrated piece of hardware, the publishing process may include a physical process that combines the image content with the audio content by using a special purpose machine. The process in this type of platform may additionally include printed and/or audio-based instructions for a manual physical process. For example, the instructions may state in written or oral form "affix audio device X into square Y indicated by the dotted lines on the printed visual matter."

In the publication process or at any other time throughout the creation of the talking paper application, any time that storage or transmission of data is required, the data may be encrypted and/or compressed to improve security and/or reduce storage capacity requirements.

Publication of the content may result in an executable file that can run on the audio playback device, such as a mobile phone, an embedded device or any other audio device described above. The published executable allows the audio playback device to control the playback flow, including fast forward, rewind, playback speed control and other similar commands. For example, if the audio playback device is a mobile phone with a camera, the camera could be used to detect mobile phone motion, which in turn could be translated into commands to fast forward or rewind audio. The executable code may include visual cues, such as progress indicators, that are secondary to the audio playback.

The authoring tool and its variations described above may, in some instances, comprise a single software tool and authoring environment, even though they may be formed from multiple software tools that form an interoperable collection of tools for authoring. This interoperable set of authoring tools is capable of publishing to different talking paper platforms using the same core audio and image content. The automated layout and interactive design logic facilitates publication to multiple talking paper platforms.

Having provided an overview of the claimed talking paper tools, the discussion now describes an illustrative architecture that may implement these tools. A discussion of an illustrative flow diagram follows, before the discussion concludes with illustrative processes for creating talking paper content with use of the described tools.

Illustrative Architecture

FIG. 1 depicts an illustrative architecture 100 that may employ the described talking paper authoring tools. As illustrated, FIG. 1 includes a user 102 operating a computing device 104. While FIG. 1 illustrates computing device 104 as a personal computer, other embodiments may employ laptop computers, mobile phones, set-top boxes, game consoles, personal digital assistants (PDAs), portable media players (PMPs) (e.g., portable video players (PVPs) and digital audio players (DAPs)), and the like. The user may also access servers 106 and 108 through a network 110, as described below.

Computing device 104 contains processors 112 and memory 114. Memory 114 may contain content 116 and a talking paper engine 122 which incorporates a set of authoring tools. The content 116 may include audio content 118 and/or image content 120. Audio content 118 may include downloaded voice or music audio, pre-recorded voice or music audio, computer generated voice or music audio and/or any other similar audio that can be associated with an image and as further described above. Image content 120, meanwhile, may include hand-drawn images, computer-generated images, imported graphics, photographs, posters, brochures, pamphlets or any other similar static images as further described above. The content 116 may be used by the talking paper engine 122 to develop a talking paper application. As illustrated, the talking paper engine 122 may include an authoring engine 124, a linking interaction engine 126, a reviewing engine 128 and a publishing engine 130.

The authoring engine 124 provides the user with the tools necessary to access and select the appropriate content 116 for the talking paper application. That is, the authoring engine 124 allows the user to lay out and select the appropriate audio content 118 and the appropriate image content 120 to meet the talking paper application requirements.

Once the user has selected the appropriate audio content 118 and image content 120, the linking interaction engine 126 is utilized to link a portion of the audio content 118 with a portion of the image content 120. This can be accomplished, for instance, by drawing a rectangle around the portion of the image content 120 that the user would like to link with the selected audio content 118. The portion of the image content 120 to link with the portion of the audio content 118 may also be selected by pointing and clicking on a particular object or by any other method in which a user selects items on a computing device.

Although FIG. 1 illustrates content 116 as being stored in memory 114, other embodiments may employ content that is stored remotely. In some instances, computing device 104 may utilize servers 106 through network 110 to access content 132. Here, the content 132 includes audio content 134 and image content 136. The user may select audio content 134 and image content 136 for download to the computing device 104 through the network 110 for use in the talking paper application. As described above, the audio content 134 and the image content 136 may comprise many different types of audio and image content.

Similarly, the talking paper engine 122 may be stored locally in memory 114 of the computing device 104, or the engine 122 may be stored and operated remotely. For instance, FIG. 1 illustrates that the user 102 may access the servers 108 through the network 110 for the purpose of operating the talking paper engine 122. As such, the engine 122 may comprise a local application or a web-accessible application, among other possibilities.

Meanwhile, after the audio content 118 and the image content 120 has been linked using the linking interaction engine 126, the user 102 may activate the reviewing engine 128. The reviewing engine 128 allows the user to simulate the talking paper application on the computing device 104. The user can visually see and hear the talking paper application to check the accuracy and compatibility of the various components of the application, i.e. the audio content, the image content and the link between them. Therefore, if the user 102 identifies a problem with the talking paper application, then the user may attempt to fix the identified problem before the talking paper application is actually published.

The reviewing engine 128 also provides reference tools for formal verification of the talking paper application. The formal verification includes checking for such items as whether the audio exists for a certain image or graphic, whether each of the links have an end to avoid infinite looping and whether there exists any link paths that may not be accessed. The reference tools can provide for many other formal checks to make sure the simulation is accurate and bug free.

Finally, once the talking paper application has been created using the authoring engine 124 and the linking interaction engine 126 and verified using the reviewing engine 128, the user may operate the publishing engine 130 to save the file in a format suitable for publishing to an end user platform. The publishing engine 130 can either be operated on computing device 104 or on servers 108 through network 110. The transfer of the talking paper application to a format suitable for use by the manufacturers or publishers 138 can be accomplished in a number of ways, including printing the images on a local printer and sending the images directly to the manufacturer either by mail or digitally along with the recorded audio file and the links or by saving the file(s) to some type of portable storage device such as a cartridge, compact disk or DVD or as further described above. The type of storage and the format will be determined by the individual manufacturer. The publishers 138 can then produce the talking paper application in the appropriate format for sending to a manufacturer to integrate the talking paper application into the final product or talking paper platform. The files may be transferred to the publisher from computing device 104 through network 110 although various modes of conveyance are possible depending on the needs of the publishers 138 and manufacturers.

Again, while the discussion above has concentrated on operating the talking engine 122 on a computing device 104, the user 102 may also utilize a talking paper engine 122 remotely using servers 108 through network 110. Note that network 110, which couples computing device 104 with servers 106 and 108, may comprise the Internet, a Local Area Network (LAN), a Wide Area Network (WAN), a wireless network, and/or the like. The talking paper engine 122 would operate in a similar manner to the talking paper engine 122 accessed on the computing device 104.

Illustrative Flow Diagram

Figure 2:
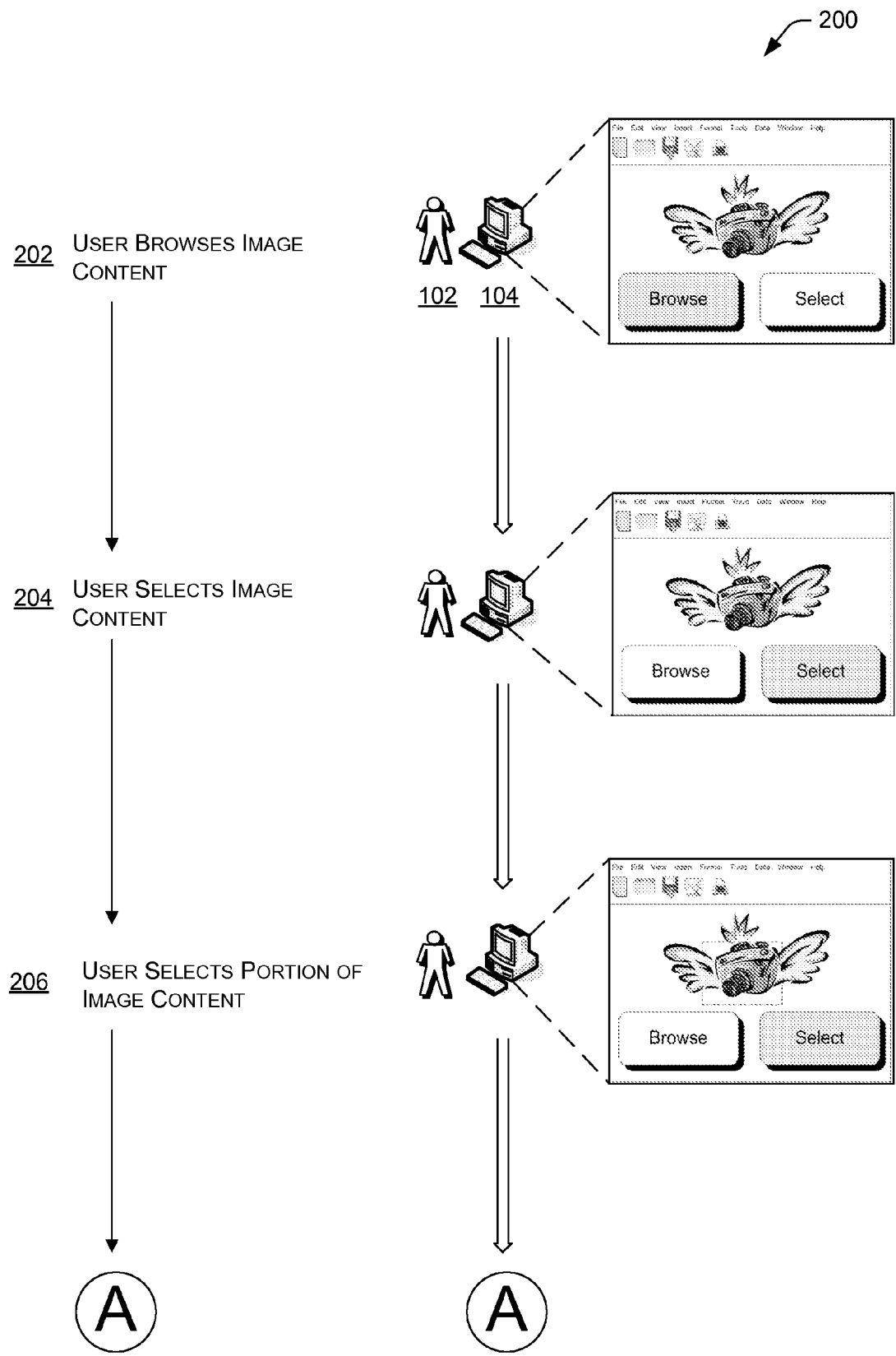
FIGS. 2-4 depict a functional flow diagram of an illustrative process for a range of unified software authoring tools used for creating talking paper applications.
Figure 3:
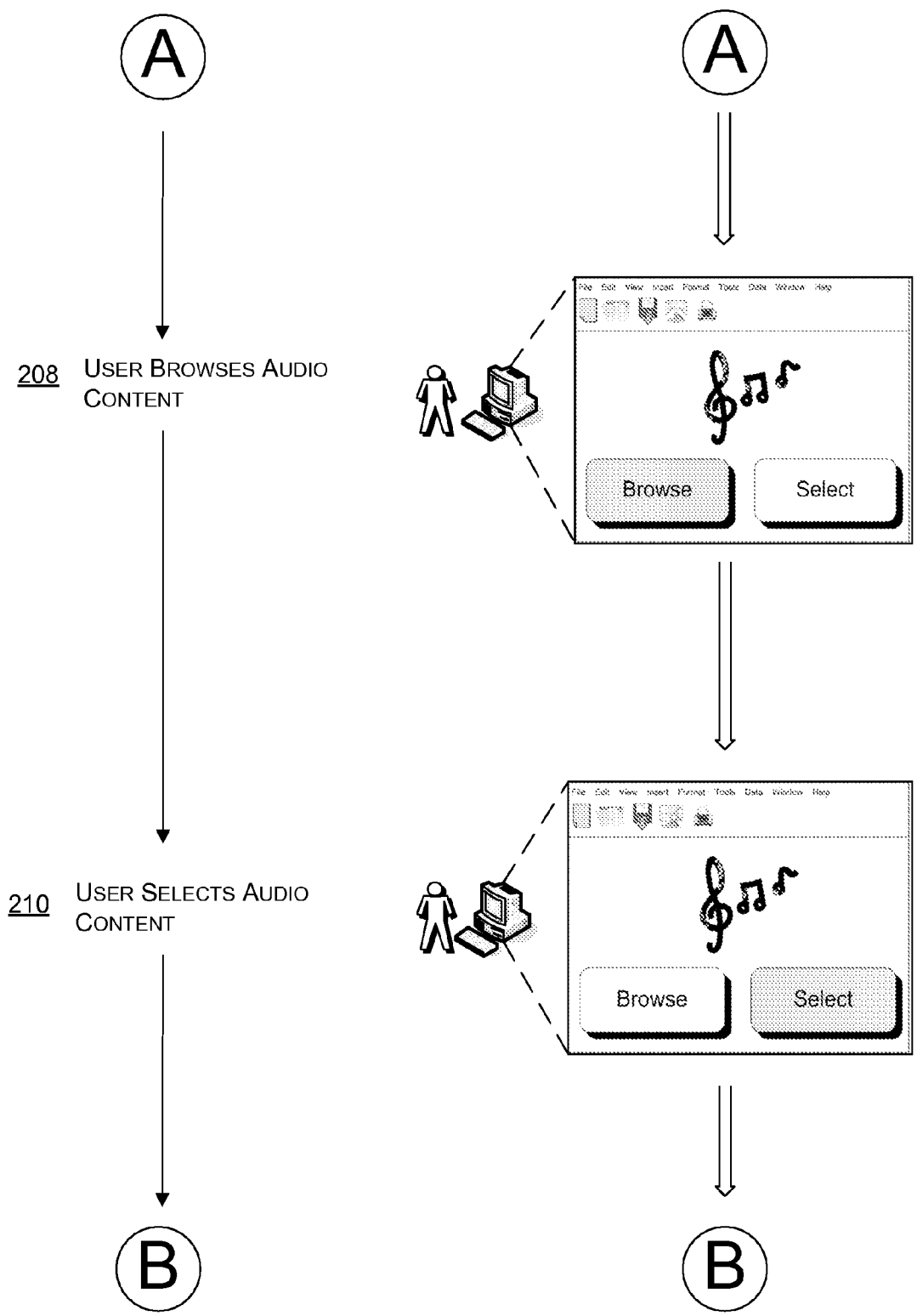
Figure 4:
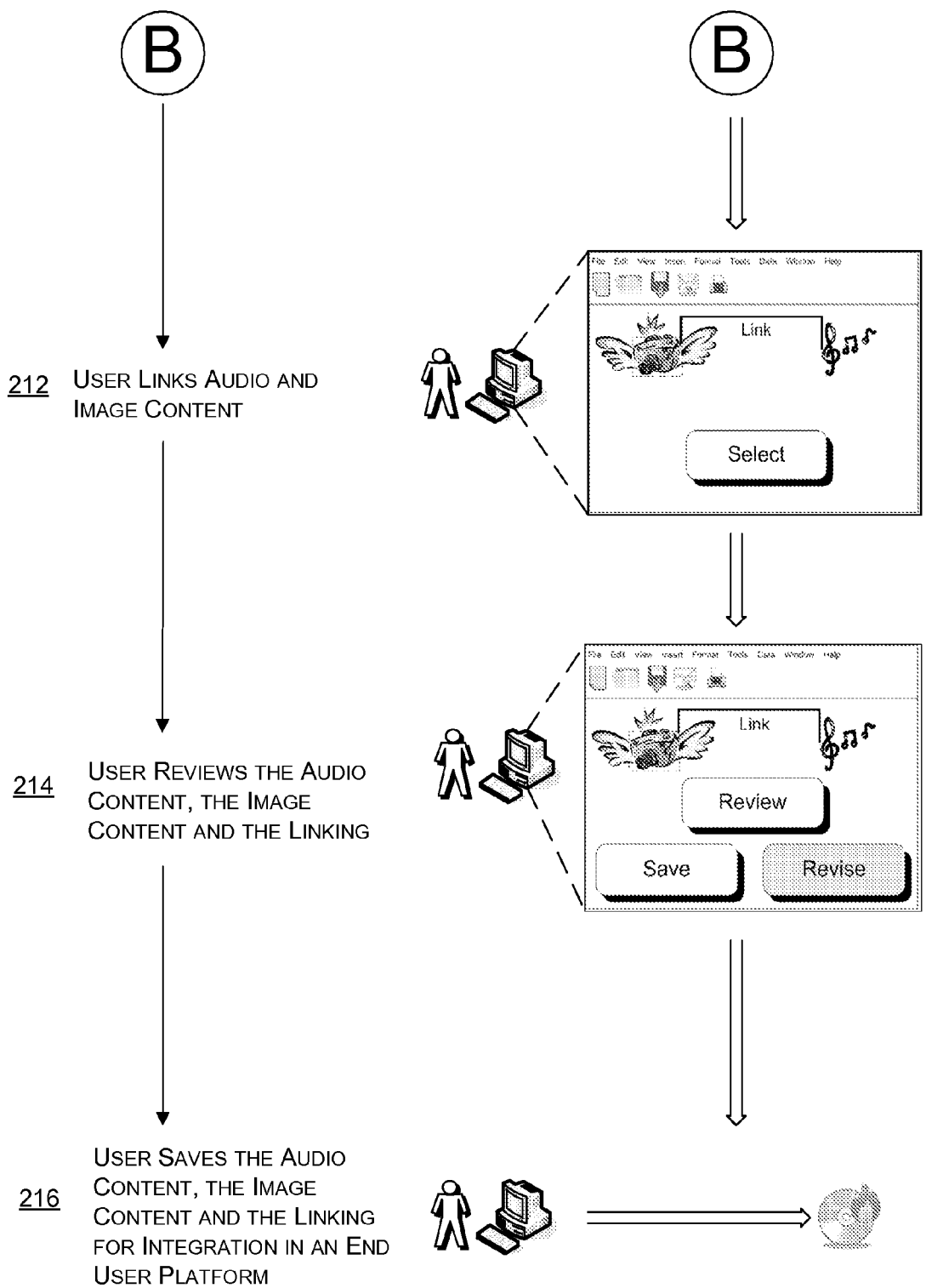

FIGS. 2-4 depict a functional flow diagram of an illustrative process for employing the described authoring tools for creating talking paper applications. Process 200 is illustrated as a logical flow diagram which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types.

Process 200 represents illustrative operations used to create a talking paper application utilizing a set of authoring tools. At operation 202, the user browses image content (e.g., locally or remotely) to peruse the library of images available. These images may include images created by the user or contained in a library of previously-created images. The browsing may be initiated by clicking on a "browse" button on the computer device 104 and scrolling through the images, for instance. After the user has had a chance to browse the image content, the user selects one or more images in operation 204. The selection operation may be accomplished by highlighting the image the user has selected and clicking on a "select" button.

The user now selects a portion of the image content in operation 206. This selection represents that portion of the image that the user will eventually link to a piece of audio that is selected. The selection may be accomplished in a number of ways. For instance, the selection process may include drawing a rectangle around that portion of the image that is to be selected and clicking on a "select" button on displayed user interface.

FIG. 3 continues the illustration of process 200. Here, at operation 208 the user browses audio files (e.g., locally or remotely) to determine the audio content the user wishes to link with the selected portion of the image content. Again, the user can click on a certain audio file that has been created or found in an audio library or some other place on the computing device 104 or the network 110 as discussed with regard to FIG. 1 above. Once the user clicks on the audio file, the computing device 104 will play that file. The user may then click on the next file to play that file until such time as the user discovers the audio content that is desired. Upon arriving at a decision, user then selects the audio content at operation 210. This selection may be accomplished by highlighting the specific audio file and clicking on the "select" button.

FIG. 4 continues the illustration of process 200 and includes operation 212, where a portion of the image content becomes associated with a portion of the audio content. In operation 212, the audio content may be activated upon activation of a corresponding portion of the image content by clicking the "select" button. In operation 214, the user reviews the audio content, the image content and the linking between the audio content and the selected portion of the image content. This review operation 214 may be accomplished by highlighting the selected portion of the image content and the audio content and clicking a "review" button to activate. The audio content will then playback while viewing the selected portion of the image content. If the review is satisfactory to the user, the user may click the "save" button to save the image content file, the audio content file and the linking file for future publishing. If the review is not satisfactory to the user, the user may click the "revise" button and some or all of the previous operations 202-212 will be repeated until the review is satisfactory to the user.

Operation 214 may also include a verification operation to verify the accuracy and compatibility of the links established between the selected portion of the image content and the audio content as well as the accuracy of the selected portion of the image content and the audio content itself. This verification operation can be performed automatically or at the instigation of the user to provide quality control over the final product prior to publishing. This verification operation includes checking for such items as whether the audio exists for a certain image or graphic, whether each of the links have an end to avoid infinite looping and whether there exists any link paths that may not be accessed In operation 216, the user saves the audio content, the image content and the linking for integration into an end user platform. The manner and format of saving will vary depending on the manufacturer. The manufacturer of the end user platform may want the final output transferred in printed format and digital format. For instance, the manufacturer may want the image printed by the publisher where the publisher will send the printed image to the publisher along with the linked audio content recorded in some other format. The audio content and the link information can be recorded on a cassette tape, a compact disk, a DVD, a flash drive or a portable hard drive or other similar type of storage device. The manufacturer may also want the whole file, i.e., the audio content, the image content and the linking information saved all together. For example, the audio content, the image content and the linking information may be saved to a storage cartridge, a compact disk, a DVD, a flash drive or a portable hard drive or other similar type of storage device. In this example, the storage media can then be shipped or digitally sent to the publisher for incorporation into an end user platform. There are many different ways to save the talking paper application for transfer to the manufacturers and it is dependent on the format and technology used and requested by the manufacturers.

Furthermore, in some instances, the user may personally publish the file by, for example, printing the image content (and potentially the links therein) and/or transferring the audio content to the audio device (e.g., a mobile phone of the user). Of course, while a few illustrative methodologies for publishing have been discussed, it is to be appreciated that the finalized talking paper application may be published in a variety of ways.

Illustrative Processes

Figure 5:
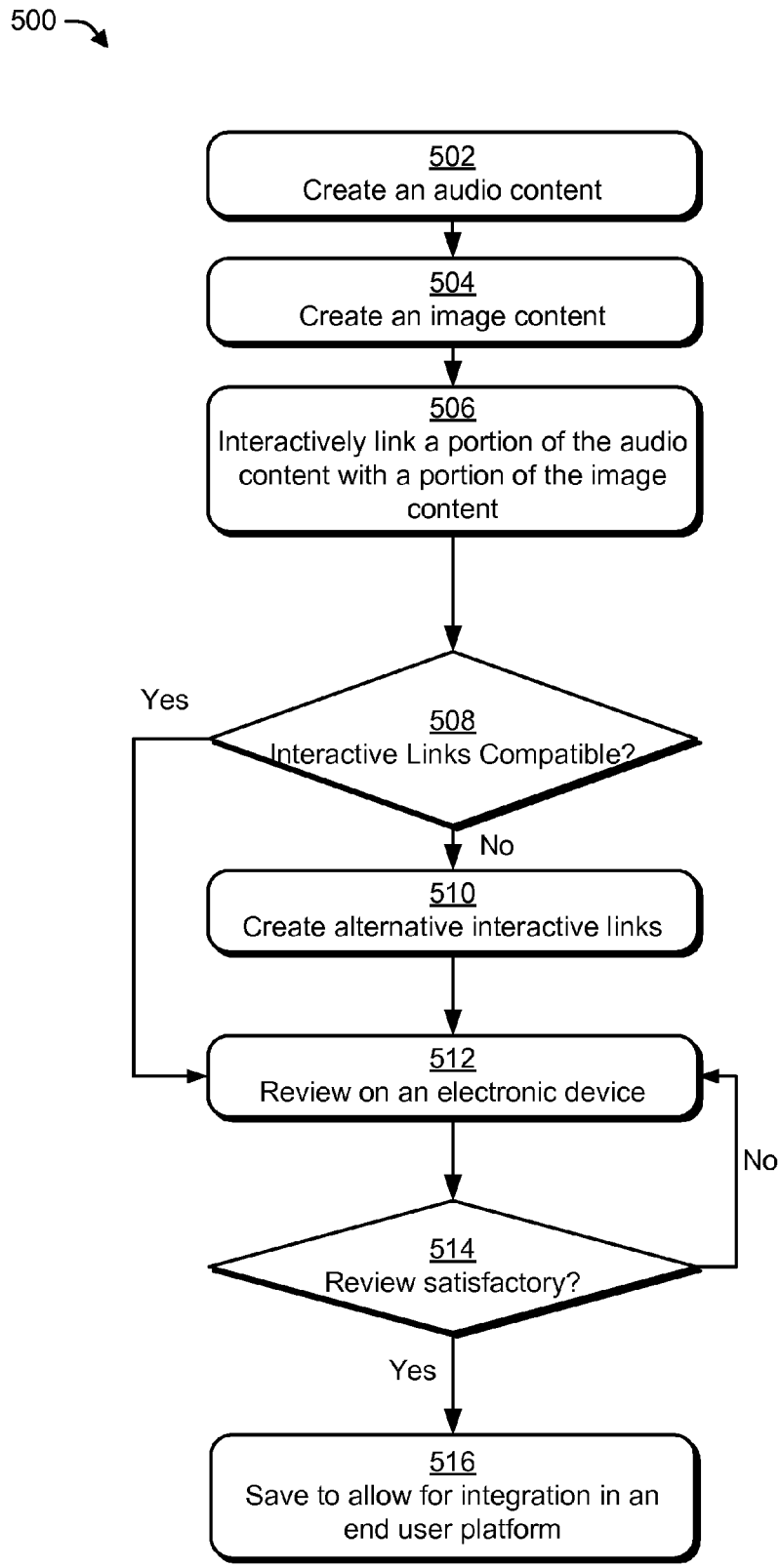
FIGS. 5-6 are flow diagrams of illustrative processes for creating a talking paper application using a unified software authoring tool.
Figure 6:
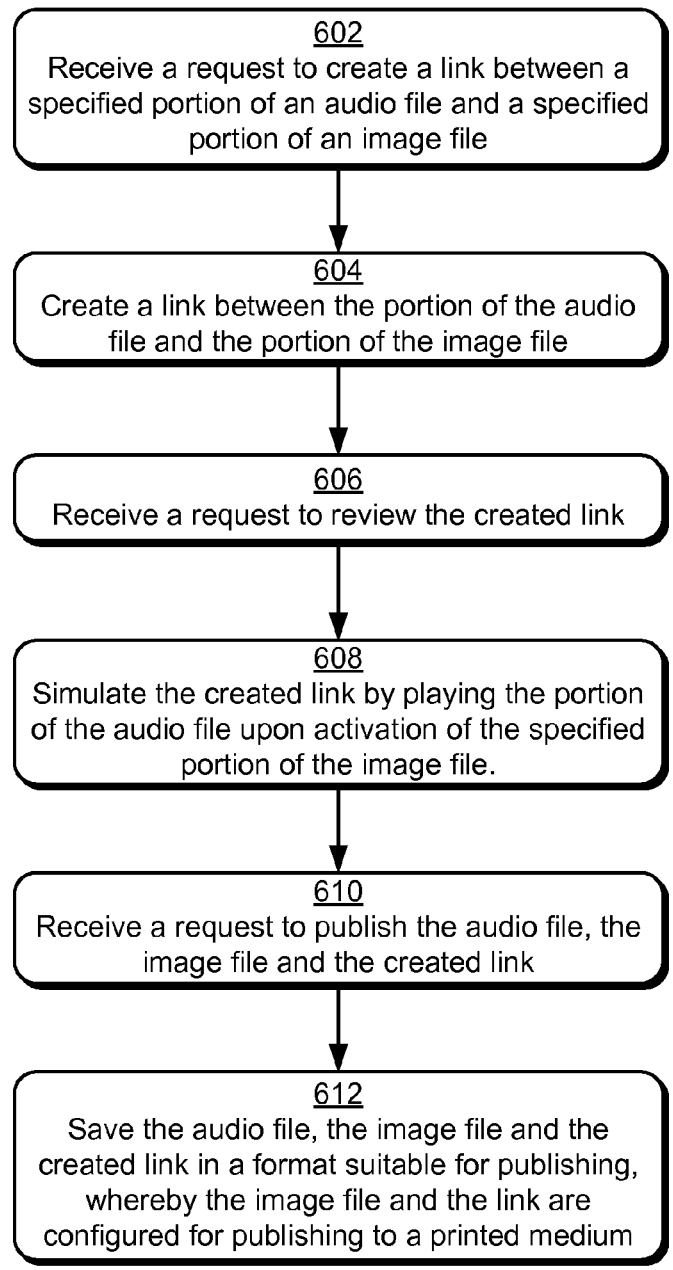

FIGS. 5-6 depict illustrative processes for creating a talking paper application using a unified software authoring tool and may be implemented by the architecture of FIG. 1 and/or by other architectures. These processes are each illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 500 includes operation 502 where an audio component is created and operation 504 where an image component is created. These operations can both include actually creating the audio component and image component or searching through a library of audio content and image content to select a previously created audio file and image file. Operation 506 interactively links a portion of the image content with audio content such that when a user chooses the selected portion of the image content, the audio content is activated and plays in concert with the selected portion of the image content.

Next, operation 508 determines whether the interactive links are compatible. This may be accomplished by using a set of reference tools that verifies the accuracy and the compatibility of the interactive links as well as the accuracy of the audio content and the image content. If the verification operation is satisfactory, operation 512 is activated and a user can then view the end result on an electronic display device, such as computing device 104. If, however, the verification operation is not satisfactory, operation 510 is activated and a user can then create alternative interactive links that once created will again pass through operation 508 until such time as the links are determined to be compatible and can proceed to operation 512.

Again, the audio content, the selected portion of the image content and the linking between the audio content and the selected portion of the image content, (i.e. the talking paper application) is physically reviewed in operation 512. This serves as a check to determine if the talking paper application is visually and audibly appealing to the user. Operation 514 queries whether the review is satisfactory and, if so, operation 516 then saves the talking paper application to allow for integration in an end user platform. As previously stated, the manner and format in which the files are saved may be dependent on the individual needs of the manufacturers.

If the review in operation 514 is not satisfactory, operation 512 is once again activated and the review is initiated again. At this point, the user can proceed back to operation 502, 504 or 506 to revise all or some of the audio content, image content or interactive linkage to correct the problem identified during operation 512. Once the revisions have been made, operation 508 may be activated again and the process will again continue through the verification and review operations 508 and 512, respectively, as described above.

FIG. 6 illustrates a process 600 which includes receiving, at operation 602, a request to create a link between a specified portion of an audio file and a specified portion of an image file. In operation 604, the process 600 includes instructions to create a link between a portion of the audio file and a portion of the image file. The link that is created allows for interactivity between the audio file and the image file to provide for educational instruction or other similar activities discussed above.

At operation 606, a request is received to review the created link. At this point, the link can be reviewed for compatibility and accuracy. Operation 608 provides for simulating the created link by playing a portion of the audio file upon activation of a specified portion of the image file. Operation 608 provides the opportunity to review the aesthetics and listening quality of the created link. At operation 610, a request is received to publish the audio file, the image file and the created link. Operation 612, meanwhile, saves the audio file, the image file and the created link in a format suitable for publishing whereby the image file and the link are configured for publishing to a printed medium. Again, the manufacturers of the end user platform may have many different needs in terms of printed medium and format. One need is to provide for printing in a static format the image file and the link compatible with the selected audio file. Once the audio file, image file and the link are saved, the saved talking paper application can be published and sent to the manufacturer for integration in an end user platform.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
    under control of one or more processors configured with executable instructions:
    creating an audio component;
    creating an image component, wherein creating the audio component and the image component comprises:
        converting a printed or computer document into audio and images using optical character recognition, text summarization and/or text-to-speech technology; and
        providing a user interface for a user to customize the audio and the images to create the audio component and the image component;
    interactively linking a portion of the audio component with a portion of the image component with a link;
    reviewing the audio component, the image component and the link on an electronic viewing device, the reviewing comprising:
        verifying whether the link between the audio component and the image component exists,
        verifying whether the link between the audio component and the image component includes an end to avoid an infinite looping, and
        verifying whether a link path of the link between the audio component and the image component is accessible; and
    saving the audio component, the image component and the link to allow for integration into an end user platform, wherein the image component is presented in a printed or digital format upon integration in the end user platform and wherein the audio component is activated upon accessing the portion of the image component in the printed or digital format.

2. The method as recited in claim 1, wherein the interactively linking the portion of the audio component with the portion of the image component comprises physically linking the portion of the audio component and the portion of the image component.

3. The method as recited in claim 1, wherein the creating of the audio component further comprises recording the audio component to an audio file.

4. The method as recited in claim 1, wherein the creating of the audio component further comprises selecting a local or remote audio file.

5. The method as recited in claim 1, wherein the creating of the audio component further comprises downloading an audio file from a website.

6. The method as recited in claim 1, wherein the creating of the image component further comprises drawing a graphics image.

7. The method as recited in claim 1, wherein the creating of the image component further comprises importing a graphics image from a website.

8. The method as recited in claim 1, further comprising publishing the audio component, the image component and the link to an audio tourbook.

9. The method as recited in claim 1, further comprising publishing the audio component, the image component and the link to an educational talking book.

10. The method as recited in claim 1, further comprising publishing the audio component, the image component and the link to an electronic greeting card.

11. A system comprising:
one or more processors;
memory, communicatively coupled to the one or more processors, storing instructions that, when executed by the one or more processors, configure the one or more processors to perform acts comprising:
creating an audio component and an image component, wherein creating the audio component and the image component comprises:
converting a printed or computer document into audio and images using optical character recognition, text summarization and/or text-to-speech technology; and
providing a user interface for a user to customize the audio and the images to create the audio component and the image component;
interactively linking a portion of the audio component with a portion of the image component with a link;
reviewing the audio component, the image component and the link on an electronic viewing device, the reviewing comprising:
verifying whether the link between the audio component and the image component exists,
verifying whether the link between the audio component and the image component includes an end to avoid an infinite looping, and
verifying whether a link path of the link between the audio component and the image component is accessible; and
saving the audio component, the image component and the link in a format to allow for integration into an end user platform, the saved format being selected from a plurality of formats and facilitating the image component to be presented in the printed or digital medium upon integration in the end user platform and the audio component to be activated upon accessing the portion of the image component in the printed or digital medium.

12. The system as recited in claim 11, the acts further comprising including a number or symbol on the image component to enable playing of the audio component when consuming the image component using a mobile device, the number or symbol being unique across all content at a page level, a specific content level or a global level in the end user platform.

13. One or more storage devices excluding signal configured with executable instructions that, when executed by one or more processors, configure the one or more processors to perform acts comprising:
under control of one or more processors configured with executable instructions:
creating an audio component;
creating an image component, wherein creating the audio component and the image component comprises:
converting a printed or computer document into audio and images using optical character recognition, text summarization and/or text-to-speech technology; and
providing a user interface for a user to customize the audio and the images to create the audio component and the image component;
interactively linking a portion of the audio component with a portion of the image component with a link;
reviewing the audio component, the image component and the link on an electronic viewing device, the reviewing comprising:
verifying whether the link between the audio component and the image component exists,
verifying whether the link between the audio component and the image component includes an end to avoid an infinite looping, and
verifying whether a link path of the link between the audio component and the image component is accessible; and
saving the audio component, the image component and the link to allow for integration into an end user platform, wherein the image component is presented in a printed or digital format upon integration in the end user platform and wherein the audio component is activated upon accessing the portion of the image component in the printed or digital format.

14. The one or more storage devices as recited in claim 13, wherein the interactively linking the portion of the audio component with the portion of the image component comprises physically linking the portion of the audio component and the portion of the image component.

15. The one or more storage devices as recited in claim 13, wherein the creating of the audio component further comprises recording the audio component to an audio file.

16. The one or more storage devices as recited in claim 13, wherein the creating of the audio component further comprises selecting a local or remote audio file.

17. The one or more storage devices as recited in claim 13, wherein the creating of the audio component further comprises downloading an audio file from a website.

18. The one or more storage devices as recited in claim 13, wherein the creating of the image component further comprises importing a graphics image from a website.

19. The one or more storage devices as recited in claim 13, further comprising publishing the audio component, the image component and the link to an audio tourbook, an educational talking book and/or an electronic greeting card.

* * * * *